United States Patent
Shooshtari (10) Patent No.: US 10,815,402 B2
(45) Date of Patent: Oct. 27, 2020

(54) FORMALDEHYDE FREE BINDER COMPOSITIONS WITH UREA-ALDEHYDE REACTION PRODUCTS

(71) Applicant: Kiarash Alavi Shooshtari, Littleton, CO (US)

(72) Inventor: Kiarash Alavi Shooshtari, Littleton, CO (US)

(73) Assignee: Johns Manville, Denver, CO (US)

(*) Notice: Subject to any disclaimer, the term of this patent is extended or adjusted under 35 U.S.C. 154(b) by 372 days.

(21) Appl. No.: 14/273,986

(22) Filed: May 9, 2014

(65) Prior Publication Data

US 2015/0119507 A1    Apr. 30, 2015

Related U.S. Application Data

(62) Division of application No. 13/490,638, filed on Jun. 7, 2012.

(51) Int. Cl.

| | | |
|---|---|---|
| *C09J 161/24* | (2006.01) | |
| *C08L 1/00* | (2006.01) | |
| *D04H 1/64* | (2012.01) | |
| *D04H 3/16* | (2006.01) | |
| *C08L 1/02* | (2006.01) | |
| *C08L 3/02* | (2006.01) | |

(52) U.S. Cl.
CPC ............. *C09J 161/24* (2013.01); *C08L 1/00* (2013.01); *D04H 1/64* (2013.01); *D04H 3/16* (2013.01); *C08L 1/02* (2013.01); *C08L 3/02* (2013.01)

(58) Field of Classification Search
CPC .................................. C08L 3/02; C09J 161/24
USPC ............................................................ 524/58
See application file for complete search history.

(56) References Cited

U.S. PATENT DOCUMENTS

| | | | | |
|---|---|---|---|---|
| 4,246,157 A | * | 1/1981 | Laitar | C08G 18/542 524/140 |
| 4,345,063 A | | 8/1982 | North | |
| 4,505,712 A | * | 3/1985 | Floyd | C08G 12/424 428/425.1 |
| 4,705,570 A | * | 11/1987 | Paul | B22C 1/2293 106/150.1 |
| 6,207,278 B1 | | 3/2001 | Jewel | |
| 7,608,167 B2 | * | 10/2009 | Luo | A61F 13/53 162/157.2 |
| 7,888,445 B2 | * | 2/2011 | Swift | C07H 5/04 527/303 |
| 2010/0189993 A1 | | 3/2010 | Mori | |

* cited by examiner

*Primary Examiner* — Vincent Tatesure
(74) *Attorney, Agent, or Firm* — Robert D. Touslee (57) ABSTRACT

Binder compositions are described that contain (1) a reducing sugar and (2) a reaction product of a urea compound and an aldehyde-containing compound. A specific example of the binder compositions include dextrose and an imidazolidine compound such as 4,5-dihydroxyimidazolidin-2-one. The binder compositions may be applied to collections of fibers and cured to form a fiber-containing composite, such as fiberglass insulation.

17 Claims, 5 Drawing Sheets

FORMALDEHYDE FREE BINDER COMPOSITIONS WITH UREA-ALDEHYDE REACTION PRODUCTS

CROSS-REFERENCES TO RELATED APPLICATIONS

This application is a division of U.S. patent application Ser. No. 13/490,638, filed Jun. 7, 2012, entitled "Formaldehyde Free Binder Compositions With Urea-Aldehyde Reaction Products, (the "parent application") which is incorporated herein by reference for all purposes.

BACKGROUND OF THE INVENTION

Organic binders for composite fiber products such as fiberglass insulation are moving away from traditional formaldehyde-based compositions. Formaldehyde is considered a probable human carcinogen, as well as an irritant and allergen, and its use is increasingly restricted in building products, textiles, upholstery, and other materials. In response, binder compositions have been developed that reduce or eliminate formaldehyde from the binder composition.

One type of these formaldehyde-free binder compositions rely on esterification reactions between carboxylic acid groups in polycarboxy polymers and hydroxyl groups in alcohols. Water is the main byproduct of these covalently crosslinked esters, which makes these binders more environmentally benign, as compared to traditional formaldehyde-based binders. However, these formaldehyde-free binder compositions also make extensive use of non-renewable, petroleum-based ingredients. Thus, there is a need for formaldehyde-free binder compositions that rely less on petroleum-based ingredient.

As an abundant and renewable material, carbohydrates have great potential to be an alternative to petroleum-based binders. Carbohydrates are already used as a component of some types for binders, such as Maillard binders that contain reaction products of reducing sugar carbohydrates and amine reactants. However, many types of carbohydrate-containing binders tend to become brittle when cured and form excessive particulates when the insulation is folded or compressed. Some carbohydrate-containing binders are also prone to accelerated degradation in humid environments and thus require additional conditioning and additives to improve their moisture/water resistance. Thus, there is a need to improve the stability and water resistance of carbohydrate-containing binder compositions to levels that are similar to or better than those of conventional, petroleum-based binder compositions. These and other issues are addressed in the present Application.

BRIEF SUMMARY OF THE INVENTION

Binder compostions are described that may include carbohydrates and a crosslinking agent made from the reaction product of a urea compound and an aldehyde-containing compound. Examples of the crosslinking agents include imidazolidine compounds made from the reaction product of urea (i.e., $H_2N\!-\!CO\!-\!NH_2$) and/or substituted ureas with diformaldehyde compounds such as glyoxal. A specific example of an imidazolidine crosslinking agent that may be used in the present binder compositions is 4,5-dihydroxyimidazolidin-2-one, which has the chemical structure:

4,5-dihydroxyimidazolidin-2-one

The binder composition may be applied to a group of fibers to form an pre-cured amalgam of binder composition and fibers. The amalgam may then be exposed to curing conditions (e.g., heating) to facilitate the curing of the binder and formation of a fiber-containing composite. During the curing stage, the crosslinking agent crosslinks the reducing sugar to form a polymeric matrix that adheres the fibers together in the fiber-containing composite. Examples of these composites include fiber insulation (e.g., fiberglass insulation) for piping, ducts, buildings, and other construction applications.

Embodiments include binder compositions containing (1) a reducing sugar and (2) a reaction product of a urea compound and an aldehyde-containing compound. The binder composition may be applied to a group of fibers and exposed to curing conditions to form a fiber-containing composite of fibers bound by the cured binder.

A more specific embodiment of the binder composition may include dextrose as the reducing sugar, and 4,5-dihydroxyimidazolidin-2-one as the reaction product of a urea compound (in this case $H_2N\!-\!CO\!-\!NH_2$) and glyoxal (OHC—CHO). When the dextrose and 4,5-dihydroxyimidazolidin-2-one are exposed to binder curing conditions, the 4,5-dihydroxyimidazolidin-2-one crosslinks the dextrose (and polymerized forms of dextrose) to make the cured binder.

Embodiments further include fiber-containing composites containing woven or non-woven fibers and a cured binder formed from a binder composition that includes (1) reducing sugar and (2) a crosslinking agent that is a reaction product of a urea compound and an aldehyde-containing compound. The fibers may be one or more types of fibers chosen from glass fibers, mineral fibers, and organic polymer fibers (among others). Non-woven glass fibers may be included in composites for fiberglass insulation.

Embodiments still further include methods of binding fibers, where the methods include the step of applying a binder composition to a mat of woven or non-woven fibers, and then curing the binder composition applied to the fibers to make a fiber-containing composite. The binder composition may include a reducing sugar and a crosslinking agent formed as a reaction product between a urea compound and an aldehyde-containing compound, as described above.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral

DETAILED DESCRIPTION OF THE INVENTION

The present binders include renewable materials such as simple carbohydrates (e.g., dextrose, fructose) crosslinked by a reaction product of a urea compound and an aldehyde-containing compound. The urea compound may be a substituted our unsubstituted urea having the formula:

where $R_1$, $R_2$, $R_3$, and $R_4$ are independently chosen from a hydrogen moiety (H), an alkyl group, an aromatic group, an alcohol group, an aldehyde group, a ketone group, a carboxylic acid group, and an alkoxy group. Exemplary alkyl groups include straight-chained, branched, or cyclic hydrocarbons of varying size (e.g., $C_1$-$C_{12}$, $C_1$-$C_8$, $C_1$-$C_4$, etc.). Exemplary aromatic (i.e., aryl) groups include substituted or unsubstituted phenyl moieties, among other aromatic constituents. Exemplary alcohol groups include —ROH, where R may be a substituted or unsubstituted, saturated or unsaturated, branched or unbranched, cyclic or acyclic, organic moiety. For example, R may be —(CH2)$_n$—, where n may be 1 to 12. Exemplary alcohols may also include polyols having two or more hydroxyl groups (—OH) in alcohol group. Exemplary aldehyde groups include —RC(=O)H, where R may be a monovalent functional group (e.g., a single bond), or a substituted or unsubstituted, saturated or unsaturated, branched or unbranched, cyclic or acyclic, organic moiety, such as —(CH2)$_n$—, where n may be 1 to 12. Exemplary ketone groups may include —RC(=O)R' where R and R' can be variety of carbon containing constituents. Exemplary carboxylic acid groups may include —R—COOH, where R may be a monovalent functional group, such as a single bond, or a variety of carbon-containing constituents. Exemplary alkoxy groups include —OR$_x$, where R$_x$ is an alkyl group.

The aldehyde-containing compound may contain one or more aldehyde functional groups. Exemplary aldehyde-containing compounds include acetaldehyde, propanaldehyde, butyraldehyde, acrolein, furfural, glyoxal, gluteraldehyde, and polyfurfural among others. Exemplary aldehyde-containing compounds may also include substituted glyoxal compounds having the formula:

where $R_5$ and $R_6$ may be independently hydrogen (H), an alkyl group, an aromatic group, an alcohol group, an aldehyde group, a ketone group, a carboxylic acid group, and an alkoxy group, among other groups.

The reaction products of the urea compound and the aldehyde-containing compound may include an imidazolidine compound having the formula:

where $R_7$, $R_8$, $R_9$, and $R_{10}$ are independently, —H, —OH, —NH$_2$, an alkyl group, an aromatic group, an alcohol group, an aldehyde group, a ketone group, a carboxylic acid group, and an alkoxy group. In one specific example of the reaction between urea and glyoxal, the reaction product may be 4,5-dihydroxyimidazolidin-2-one.

The reaction product of the urea compound and the aldehyde-containing compound may act as a crosslinking agent for the reducing sugar. During a curing stage the crosslinking agent can bond to two or more reducing sugars (either polymerized or unpolymerized) to form a crosslinked, polymeric cured binder.

The reducing sugar may be any sugar having an aldehyde group, or a ketone group that is capable of isomerizing to produce an aldehyde group. Exemplary reducing sugars include monosaccharaides such as glucoses (e.g., dextrose), fructose, glyceraldehyde, and galactose. They also include polysaccharaides such as lactose, maltose, xylose, and amylose, among others. The binder compositions may include a single reducing sugar or a combination of two or more reducing sugars as the reducing sugars in the composition.

Figure 1:
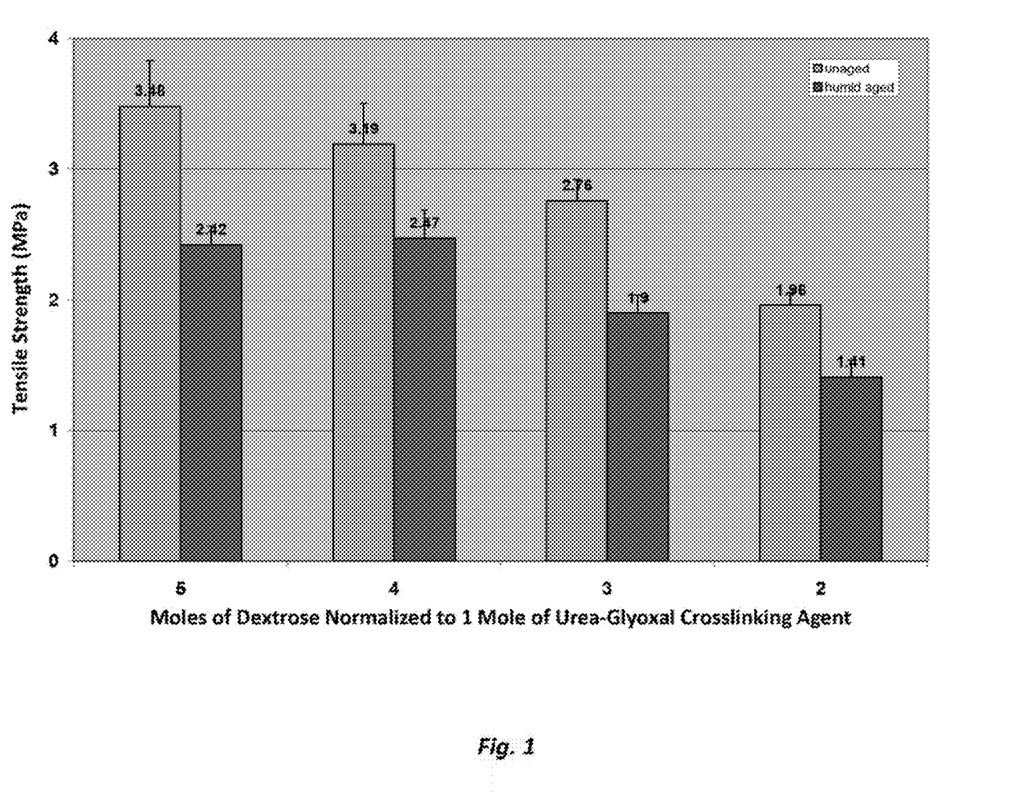
FIG. 1 shows a graph of dogbone tensile strength test results for different mole ratios of reducing sugar to crosslinking agent.

The molar ratio of the (1) crosslinking reaction product of the urea compound and the aldehyde-containing compound to (2) the reducing sugar generally ranges from 1:2 to 1:50. Exemplary ratios of crosslinking agent to reducing sugar include a range from 1:4 to 1:10. FIG. 1 shows a graph of dogbone composite tests of tensile strength for binder compositions using a reaction product of urea [CO(NH$_2$)$_2$] and glyoxal [OCHCHO] as the crosslinking agent and dextrose [C$_6$H$_{12}$O$_6$] as the reducing sugar. The graph shows the tensile strength of the composites peaking at 4 to 5 moles of dextrose normalized for 1 mole of the crosslinking agent. This translates into a peak tensile strength at (crosslinking agent):(reducing sugar) mole ratios between 1:4 and 1:5. The tensile strength shows no significant increases for higher relative moles of the dextrose relative to the urea-glyoxal crosslinking agent. While not wishing to be bound by a particular theory, it is believed that the molar ratio between 1:4 and 1:10 facilitates the highest crosslinking density in the cured binder.

In addition to the reducing sugars, the present binder compositions may also include non-reducing sugars and celluloses, such as starches, modified starches, celluloses, modified celluloses, and dextrins (e.g., cyclodextrins and maltodextrins), among others.

The binder composition may further include one or more additional components such as adhesion prompters, oxygen scavengers, solvents, emulsifiers, pigments, organic and/or inorganic fillers, flame retardants, anti-migration aids, coalescent aids, wetting agents, biocides, plasticizers, organosilanes, anti-foaming agents, colorants, waxes, suspending agents, anti-oxidants, and secondary crosslinkers, among other components. In some instances, some or all of the additional components are pre-mixed with the binder composition before it is applied to fibers and cured. In additional instances, some or all of the additional components may be introduced to the curable, curing, and/or cured fiber-containing composite during or after the initial binder composition is applied to the fibers.

The binder compositions may also include one or more catalysts to increase the rate of the crosslinking reactions between the reducing sugars and crosslinking agents when the composition is exposed to curing conditions. Exemplary catalysts may include alkaline catalysts and acidic catalysts. The acidic catalysts may include Lewis acids (including latent acids and metallic salts), as well as protic acids, among other types of acid catalysts. Lewis acid catalysts may a salt of a deprotonized anion such as a sulfate, sulfite, nitrate, nitrite, phosphate, halide, or oxyhalide anion in combination with one or more metallic cations such as aluminum, zinc, iron, copper, magnesium, tin, zirconium, and titanium. Exemplary Lewis acid catalysts include aluminum sulfate, ferric sulfate, aluminum chloride, ferric chloride, aluminum phosphate, ferric phosphate, and sodium hypophosphite (SHP), among others. Exemplary latent acids include acid salts such as ammonium sulfate, ammonium hydrogen sulfate, mono and dibasic ammonium phosphate, ammonium chloride, and ammonium nitrate, among other latent acid catalysts. Exemplary metallic salts may include organo-titanates and organo-zirconates (such as those commercially manufactured under the tradename Tyzor® by DuPont), organo-tin, and organo-aluminum salts, among other types of metallic salts. Exemplary protic acids include sulfuric acid, phosphoric acid, hydrochloric acid, nitric acid, sulfonic acid compounds (i.e., $R-S(=O)_2-OH$) such as p-toluenesulfonic acid and methanesulfonic acid, and carboxylic acids, among other protic acids. Catalyst compositions may also include combinations of two or more catalysts, for example the combination of ammonium sulfate and diammonium phosphate.

Exemplary concentrations of the catalyst (or combination of catalysts) in the binder composition may have a range from about 1 wt. % to about 20 wt. % of the composition. For example, the catalyst concentration may range from about 1%, 2%, 3%, 4%, 5%, 6%, 7%, etc., on the low end, and 10%, 11%, 12%, 13%, 14%, 15%, 16%, 17%, 18%, 19%, or 20 wt. % on the high end. Exemplary catalyst concentrations may include about 5 wt. %, about 7.5 wt. %, about 8 wt. %, about 9 wt. %, and about 10 wt. %, among other concentrations.

The pH of the present binder compositions may vary depending upon the types and relative concentrations of the components used. Typically the pH of the present binder compositions are slightly acidic to alkaline with a pH range of about 6 to 8 (e.g., 6.5 to 7.5). The binder compositions have a pH that creates relatively little or no acid-based corrosion of metal fabrication equipment.

The binder compositions may be used to make fiber-containing composites that include woven or non-woven fibers bound together by a cured matrix of the binder. The fibers in the composite may include one or more types of fibers chosen from glass fibers, carbon fibers, mineral fibers, and organic polymer fibers, among other kinds for fibers. At the conclusion of the curing stage, the cured binder may be present as a secure coating on the fiber mat at a concentration of approximately 0.5 to 50 percent by weight of the composition, for example the cured binder may be present at concentration of approximately 1 to 10 percent by weight of the composition.

The fiber-containing composites may take a variety of forms, for example construction materials including piping insulation, duct boards (e.g., air duct boards), and building insulation, reinforcement scrim, and roofing membranes, among other construction materials. Additional examples may include loose-fill blown insulation, duct liner, duct wrap, flexible duct media, pipe insulation, tank insulation, rigid plenum liner, textile duct liner insulation, equipment liner, oven insulation, elevated temperature board, elevated temperature wrap, elevated temperature panel, insulation batts and rolls, heavy density batt insulation, light density batt insulation, exterior foundation insulation board, and marine hull insulation, among other materials. The composites can also find use in printed circuit boards, battery separators, and filter stock, among other applications.

Figure 2A:
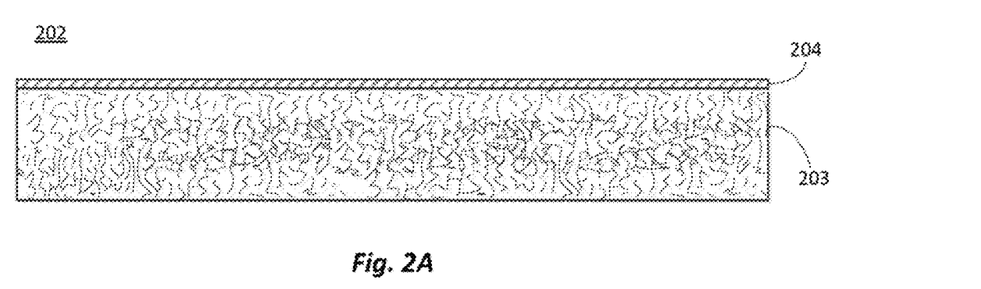
FIGS. 2A-C show simplified illustrations of exemplary composite materials according to embodiments of the invention.
Figure 2B:
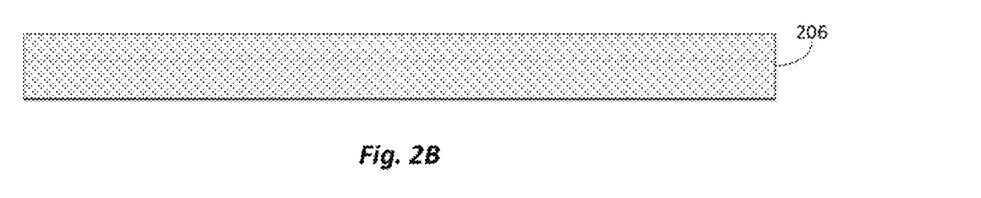
Figure 2C:
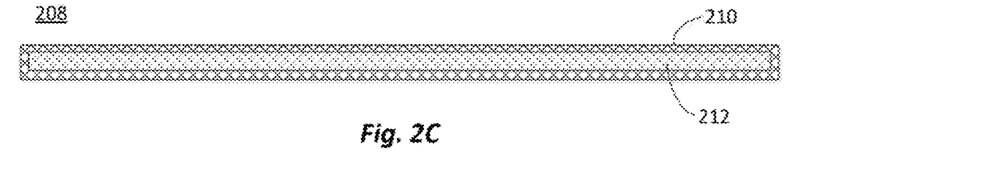

FIG. 2A-C illustrate some of these exemplary composite materials. FIG. 2A is a simplified schematic of an exemplary fiber-containing batt material 202 that may be used for building insulation. The material 202 may include a batt 203 of non-woven fibers held together by the binder. The fibers may be glass fibers used to make fiberglass insulation (e.g, low-density or high-density fiberglass insulation), or a blend of two or more types of fibers, such as a blend of glass fibers and organic polymer fibers, among other types of fibers. In some examples, a facer 204 may be attached to one or more surfaces of the batt 203.

FIG. 2B is a simplified schematic of an exemplary fiber-containing composite board 206 that may be used as an insulation board, duct board, elevated temperature board, etc. The fibers in board 206 may include glass fibers, organic polymer fibers, carbon fibers, mineral fibers, metal fibers, among other types of fibers, and blends of two or more types of fibers.

FIG. 2C is a simplified schematic of an exemplary fiber-containing flexible insulation material 208 that may be used as a wrap and/or liner for ducts, pipes, tanks, equipment, etc. The fiber-containing flexible insulation material 208 may include a facer 210 attached to one or more surfaces of the fiber material 212. Exemplary materials for the facer 210 may include fire-resistant foil-scrim-kraft facing.

Specific examples of fiber-containing composites that use the present binder compositions include low-density fiberglass insulation (e.g., less than about 0.5 lbs/ft$^3$) and high-density fiberglass insulation.

The present binder compositions may be used in methods of binding fibers to make the fiber-containing composites. The fiber-containing composites may include fibers of one or more types, such as glass fibers, carbon fibers, and organic polymer fibers, among other types of fibers. The binder compositions used to make the composites may include a reducing sugar and a reaction product of a urea compound and an aldehyde-containing compound as described above. The methods may include the step of applying the binder composition to a mat of woven or non-woven fibers to make a curable binder-fiber amalgam. The curable amalgam is then cured to form the fiber-containing composite of fibers bound together by the cured binder.

The step of applying the binder composition to the fibers may be done by a variety of techniques including spraying, spin-curtain coating, curtain coating, and dipping-roll coating. The composition can be applied to freshly-formed fibers, or to fibers that have been cooled and processed (e.g., cut, coated, sized, etc.). The binder may be provided to the applicator as a premixed composition or may be supplied to the applicator in separate solutions for the crosslinking agent and the reducing sugar component. In some instances where the binder composition includes a solvent, a portion or all of the solvent may be removed from the composition before or after its application on the fibers.

The step of curing the binder composition may include exposing the composition applied to the fibers to an environment conducive to curing. For example, the curable amalgam of fibers and binder composition may be heated to a binder curing temperature. Exemplary binder curing temperatures may include a temperature range from 100° C. to 250° C. The curing amalgam may be heated to the curing temperature for a period of 1 minute to 100 minutes (e.g., 20 minutes).

The curing step may produce the finished fiber-containing composite, such as fiberglass insulation. In some exemplary methods, additional agents like an anti-dusting agent may be applied during or following the curing step.

Figure 3:
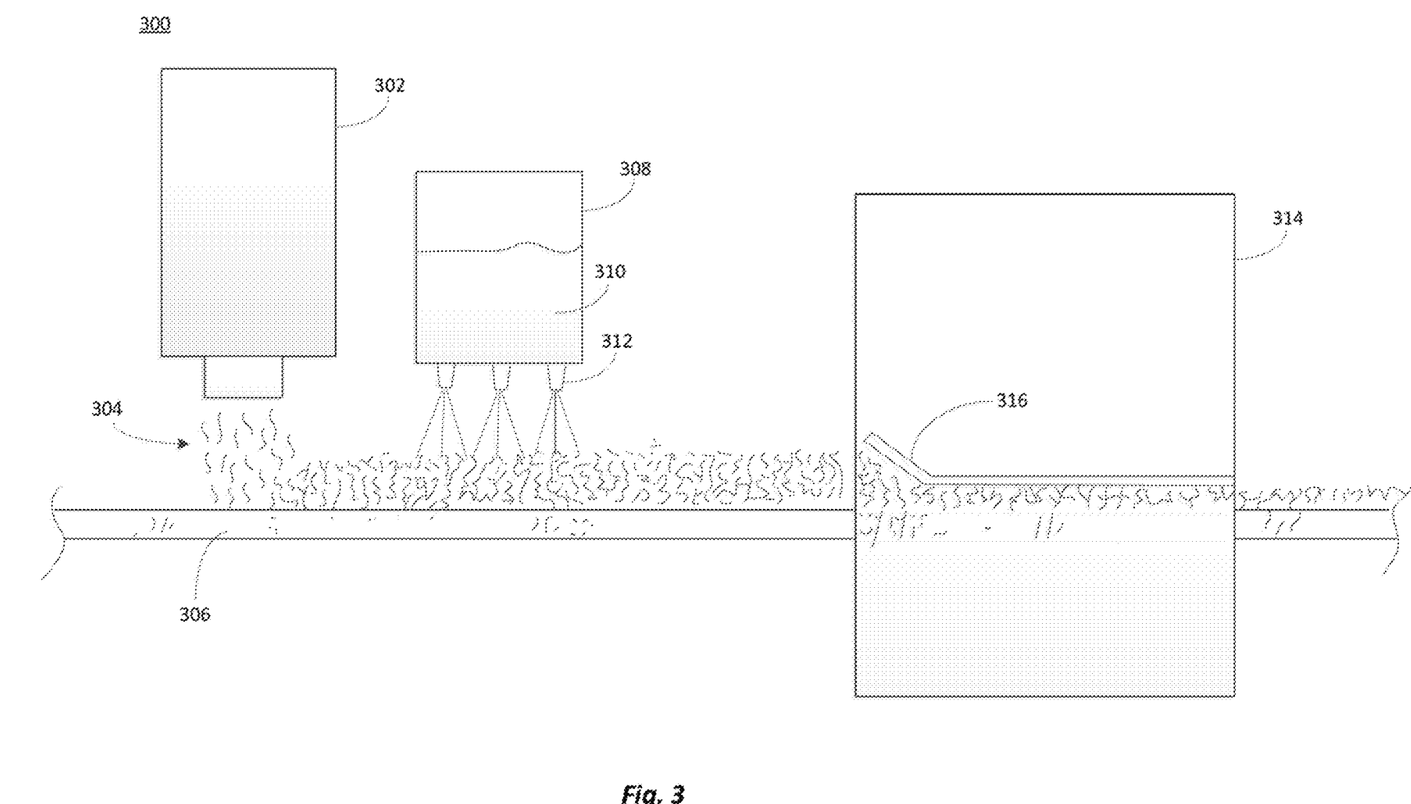
FIG. 3 depicts a simplified schematic of an exemplary fabrication system for making the fiber-containing composites according to embodiments of the invention.

FIG. 3 shows a simplified schematic of an exemplary fabrication system 300 for making the fiber-containing composites described above. The system 300 includes fiber supply unit 302 that supplies the fibers for the composite. The fiber supply unit 302 may be filled with pre-made fibers, or may include equipment for making the fibers from starting materials such as molten glass or organic polymers. The fiber supply unit 302 deposits the fibers 304 onto a porous conveyor belt 306 that transports the fibers under the binder supply unit 308.

The binder supply unit 308 contains a liquid uncured binder composition 310, that is deposited onto the fibers 304. In the embodiment shown, the binder composition 310 is spray coated onto the fibers 304 with spray nozzles 312, however, other application techniques (e.g., curtain coating, dip coating, etc.) may be used in addition to (or in lieu of) the spray coating technique illustrated by nozzles 312.

The binder composition 310 applied on fibers 304 forms a fiber and binder amalgam on the top surface of the conveyor belt 306. The belt 306 may be perforated and/or porous to allow excess binder composition 310 to pass through the belt 306 to a collection unit (not shown) below. The collection unit may include filters and circulation pumps to recycle at least a portion of the excess binder back to the binder supply unit 308.

The conveyor belt 306 transports the amalgam to an oven 314 where it is heated to a curing temperature and the binder composition starts to cure. The temperature of the oven 314 and the speed of the conveyor belt 306 can be adjusted to control the curing time and temperature of the amalgam. In some instances, process conditions may set to completely cure the amalgam into the fiber-containing composite. In additional instances, process conditions may be set to partially cure the amalgam into a B-staged composite.

The amalgam may also be compressed prior to or during the curing stage. System 300 shows an amalgam being compressed by passing under a plate 316 that tapers downward to decrease the vertical space available to the curing amalgam. The amalgam emerges from under the plate 316 in a compressed state and has less thickness than when it first made contact with the plate. The taper angle formed between the plate 316 and conveyor belt 306 can be adjusted to adjust the level of compression placed on the amalgam. The partially or fully cured composite that emerges from under plate 316 can be used for a variety of applications, including construction materials such as pipe, duct, and/or wall insulation, among other applications.

EXAMPLES

Example 1A—Tensile Strength Testing of Dextrose Binder Composites

Comparative tensile strength tests were conducted on composites made with an exemplary dextrose/urea-glyoxal binder composition and composites made with a standard commercial polyacrylic binder composition. The dextrose/urea-glyoxal composition was prepared by mixing 60 g of urea, 145 g of a 40 wt % solution of glyoxal, at a temperature of 90° C. for about 120 minutes. The urea and glyoxal react to form crosslinking agents for the binder composition, including cyclic urea-glyoxal compounds (e.g., 4,5-dihydoxyimidazolidin-2-one). Next, 918 g of water and 989 g of dextrose monohydrate (900 g active) were added to the reacted urea-glyoxal solution to form the uncured binder composition for making the dogbone composite. To this solution was added 76.4 g ammonium sulfate as a catalyst. The uncured polyacrylic binder composition was made by mixing a commercial polyacrylic acid (QRXP-1765 acrylic resin from Dow Chemical) with triethanol amine that acted as a crosslinking agent.

Each of the binder compositions was formulated into 25 g samples having a 50 wt. % solids level and mixed with 1000 g of glass beads to make uncured composites. Roughly 1 ounce samples of the uncured composites were then spread into dogbone molds and pressed in the molds at a pressure of about 10,000 lbs. The dogbone samples were then released from the molds and heated at about 400° F. for about 20 minutes to form cured dogbone composites. The cured dogbone composites were roughly 25 mm wide and 6 mm thick.

Figure 4:
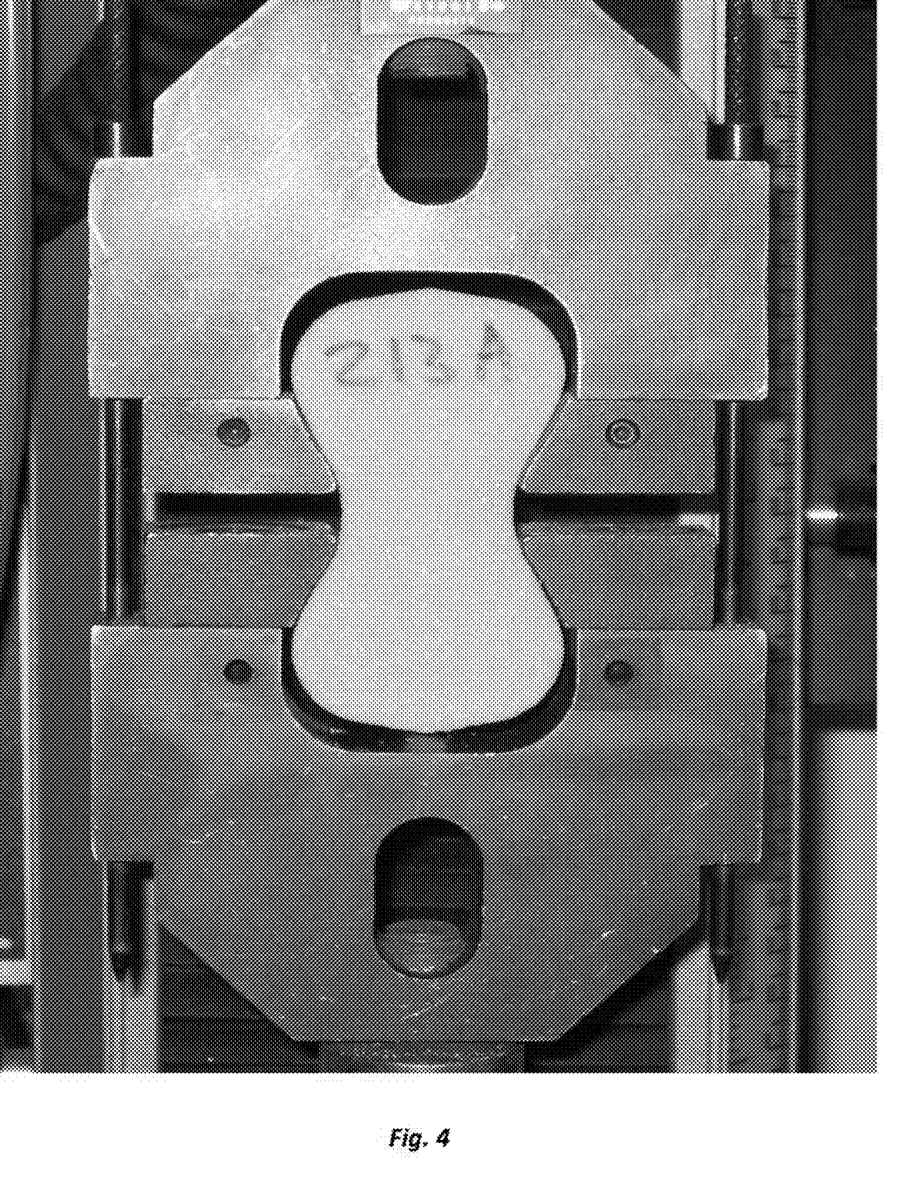
FIG. 4 is a picture of a cured dogbone composite placed in an Instron tensile strength measuring instrument.

The cured dogbone composites were tested for tensile strength in both an unaged condition and after being aged in a high humidity atmosphere. The unaged composites were taken directly from the curing oven and placed in an Instron tensile strength testing instrument (Harry W. Dietert Co.—Tensile Core Grip Assembly Part No. 610-7CA) as shown in FIG. 4. The aged composites were taken from the curing oven and placed for 24 hours in a humidifying oven set at approximately 95% humidity and 120° F. After the aged samples were cooled for approximately 8 hours, they were placed in the Instron instrument to test their tensile strength.

Figure 5:
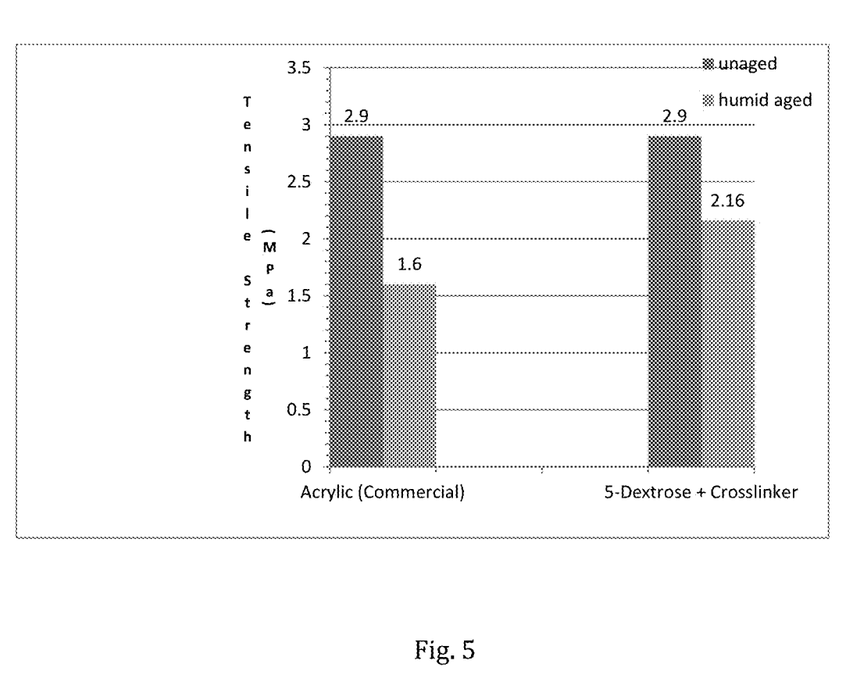
FIG. 5 is a graph with dogbone tensile strength test results for binder composites.

FIG. 5 is a graph showing the dogbone tensile strength test results for the dextrose/urea-glyoxal binder under unaged and humid-aged conditions, as well the strength test results for the comparative composite made from the commercial polyacrylic acid binder. The results demonstrate that the unaged dextrose/urea-glyoxal binder and an almost identical tensile strength as the unaged commercial polyacrylic binder at 2.9 MPa. When both samples were aged at 120° F. and 95% humidity for 24 hours, the aged dextrose/urea-glyoxal binder showed significantly higher tensile strength (2.15 MPa) compared with the aged polyacrylic binder (1.6 MPa).

Example 1B—Tensile Strength Testing of Fructose/Dextrose Binder Composites

Additional tensile strength tests were conducted on composites made with exemplary binder compositions that included combinations of fructose and dextrose reacted with a urea-glyoxal crosslinking agent. A first fructose+dextrose/ urea-glyoxal binder composition was prepared by mixing 60 g of urea, 145 g of a 40 wt % solution of glyoxal, at a temperature of 90° C. for about 120 minutes. The urea and glyoxal react to form crosslinking agents for the binder composition, including cyclic urea-glyoxal compounds (e.g., 4,5-dihydoxyimidazolidin-2-one). Next, 918 g of water and 989 g of 42 wt. % fructose and 55 wt. % dextrose monohydrate were added to the reacted urea-glyoxal solution to form the uncured binder composition for making the dogbone composite. To this solution was added 76.4 g ammonium sulfate as a catalyst. A second fructose+dextrose/urea-glyoxal binder composition was prepared using the same components and preparation method, except the fructose:dextrose ratio was changed to 55 wt. % fructose and 42 wt. % dextrose. Dogbone composites were prepared from both the first and second fructose+dextrose/urea-glyoxal binder compositions in the same method as described in Example 1A above. The dogbone tensile strength test results demonstrated similar tensile strengths for the fructose+dextrose/urea-glyoxal binder compositions as the dextrose-only compositions.

Example 2—Preparation of an Exemplary Glass-Fiber Composites

A glass-fiber composite was made from a dextrose/urea-glyoxal binder composition and a nonwoven glass fiber mat. Preparation of the binder composition started by mixing 60 kg or urea into a 145 kg aqueous glyoxal solution (40 wt. % glyoxal (58 kg on dry basis)) at room temperature until the urea dissolved. The urea-glyoxal solution temperature was then increased to 80° C. and kept at 80-85° C. for 2 hours while stirring the solution at 500 rpm to facilitate the reaction of the urea and glyoxal. At the end of the reaction period, a 57 wt. % solution of the urea-glyoxal crosslinking agent was formed.

918 kg or water and 989 kg of dextrose monohydrate (900 kg active) were added to the crosslinking solution and the combined mixture was stirred until the dextrose dissolved. The mole ratio of urea:glyoxal:dextrose in the solution was 1:1:5. 76.4 kg of ammounium sulfate was added to the solution as a catalyst, and stirred until the catalyst dissolved to make the binder composition.

Manufacture and Testing of R19 Fiberglass Insulation Batts

The binder composition was spray coated onto a nonwoven glass-fiber mat made from blown filaments of sodium borosilicate glass having diameters ranging from about 1 to 10 μm and lengths ranging from of about 5 to 100 mm. The amalgam of the fibers and binder composition was then conveyed through a curing oven operated at a temperature of 150° C. to 350° C. to heat the amalgam to a curing temperature for about 30 seconds to 3 minutes. The bat of glass fibers held together by the cured binder emerged from the oven with an approximate thickness of about 3 to 4 cm and a nominal weight of about 440 g/m² and density of about 11.2 kg/m³.

The cured bat was used to make R-19 building insulation. The droop (rigidity) and recovery of the batts were evaluated under unaged conditions, as well as after aging for 7 and 14 days at 120° F. and 95% humidity. The performance of the batts made with the dextrose-urea-glyoxal binder composition was compared to bats made with conventional binder compositions. The comparative tests found the unaged batts made with the dextrose-urea-glyoxal binder composition had 10% improved rigidity (i.e., lower sag) compared with comparable batts made with a conventional binder composition (acrylic), and the aged batts showed an even larger 20% improvement in rigidity (lower sag). This improvement in the rigidity of the batts made with the dextrose-urea-glyoxal binder composition did not result in any diminishment of their recovery performance compared to the conventional batts. In addition, the emissions of volatile organic compounds (VOCs) from batts made with the urea/glyoxal/dextrose binder compositions were significantly lower than batts made with the conventional acrylic binder compositions. No release of formaldehyde was detected from the urea/glyoxal/dextrose batts. Table 1 below summarizes the droop, recovery, and VOC emissions results for the various sample batts tested:

TABLE 1

Droop and Recovery Results for R19 Insulation Batts

| Sample | Droop (Rigidity)-[Inches] | Recovery-[Inches] | VOC Emissions-[lb/hour] |
|---|---|---|---|
| Urea/glyoxal/dextrose binder composition (unaged) | 2.1 | 6.7 | 0.8 |
| Urea/glyoxal/dextrose binder composition (Aged 7 days) | 3.4 | 6.0 | N/A |
| Urea/glyoxal/dextrose binder composition (Aged 14 days) | 3.5 | 6.0 | N/A |
| PF Binder (unaged) | 2.5 | 6.5 | 0.9 |
| PF Binder (Aged 7 days) | 4.2 | 6.1 | N/A |
| PF Binder (Aged 14 days) | 4.5 | 6.0 | N/A |

Manufacture and Testing of Duct Board

The present dextrose-urea-glyoxal binder compositions are also used to make duct board. Two compositions were independently prepared using 145 kg of 40 wt. % aqueous glyoxal mixed with 60 kg urea and 989 kg dextrose monohydrate. 76.4 kg of ammonium sulfate was added to one of the compositions, while 50 kg of ammonium sulfate and 50 kg of diammonium phosphate was added to the other. Each of the binder compositions was used to make 1.9 cm thick duct board having a binder content of 18 wt % and density of 700 kg/m3 using standard process conditions (e.g., cure temperature of 500-550° F.).

The structural characteristics and volatile organic compound (VOC) emissions of the duct boards were tested and compared to duct board made with a conventional phenol-formaldehyde (PF) binder composition. The results showed that the droop (rigidity) and EI modulus of the duct boards made with the urea/glyoxal/dextrose binder compositions improved by about 20% compared to the duct boards made with the conventional PF binder composition. The present duct boards also had significantly reduced VOC emissions compared to the PF board. The improvements in the duct boards' structural characteristics were similar for the urea/glyoxal/dextrose binder compositions that included ammonium sulfate [$(NH_4)_2SO_4$] alone versus the combination of ammonium sulfate and diammonium phosphate [$(NH_4)_2SO_4$ and $(NH_4)_2HPO_4$]. Table 2 below summarizes the droop, EI modulus, and VOC emisisons results for the various duct boards tested:

TABLE 2

Droop and El Modulus Results for Duct Boards

| Sample | Droop (Rigidity)- [Inches] | El Modulus- [N·m²?] |
|---|---|---|
| Urea/glyoxal/dextrose binder composition with $(NH_4)_2SO_4$ alone | 2.5 | 183 |
| Urea/glyoxal/dextrose binder composition with $(NH_4)_2SO_4$ and $(NH_4)_2HPO_4$ | 1.3 | 153 |
| Conventional Phenol-Formaldehyde binder Composition | 2.5 | 145 |

Additional Characteristics of the Present Insulation Batts and Duct Boards

Fiberglass insulation batts and duct boards made with the present urea/glyoxal/dextrose binder compositions were measured on a number of characteristics described in Table 3 below. For all the characteristics, the batts and boards met or exceeded current standards requirements for residential and commercial building materials set by the American Society for Testing and Materials (ASTM) and Underwriters Laboratory (UL).

TABLE 3

Characteristics of R19 Insulation Batt and Duct Boards

| Characteristic | R19 Insulation Batt | Duct Board |
|---|---|---|
| Density | 0.25-0.75 lbs/ft³ | 2.0-6.0 lbs/ft³ |
| Loss on Ignition (LOI) | 3 wt. %-6 wt. % | 15 wt. %-22 wt. % |
| Tensile Strength | 0.35-1.0 psi | |
| Thickness Recovery | 5 inches-7 inches | 0.9 inches-1.1 inches |
| Dust Testing | 10-50 g/10,000 ft² | 0.03-0.3 g/lb |
| Water Absorption | >0.5 wt % | >5 wt. % |
| Flexural Rigidity (E·I) | | <400 EI |
| Stiffness-Rigidity | ≤5 inches for 36 inch span | |
| Hot Surface Performance | | Meets C411 Requirements |
| Corrosivity on Steel | Mass loss corrosion rate <5 ppm chloride reference solution (ASTM C1617) | Mass loss corrosion rate <5 ppm chloride reference solution (ASTM C1617) |
| Smoke Development on Ignition | Flame spread of <25, and smoke developed <50 using ASTM E84; Classified as Non-Combustible based on ASTM E136. | Flame spread of <25, and smoke developed <50 using ASTM E84 |

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the fiber" includes reference to one or more fibers and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A fiber-containing composite comprising:
   woven or non-woven fibers; and
   a cured binder formed from a binder composition comprising:
   reducing sugar; and
   a crosslinking agent comprising:

wherein $R_1$ and $R_2$ are independently —H, —OH, —$NH_2$, an alkyl group, an aromatic group, an alcohol group, an aldehyde group, a ketone group, a carboxylic acid group, or an alkoxy group,
   wherein the cured binder includes crosslinked polymers formed by direct reaction of the crosslinking agent with the reducing sugar, and the cured binder substantially lacks crosslinked polymers formed by the reaction of free glyoxal with the reducing sugar; and
   wherein a molar ratio of the crosslinking agent to the reducing sugar ranges from 1:2 to 1:50.

2. The fiber-containing composite of claim 1, wherein the fibers include one or more types of fibers chosen from glass fibers, mineral fibers, and organic polymer fibers.

3. The fiber-containing composite of claim 1, wherein the reducing sugar is chosen from glucose, dextrose, fructose, maltose, xylose, and amylose.

4. The fiber-containing composite of claim 1, wherein the reducing sugar consists essentially of dextrose.

5. The fiber-containing composite of claim 1, wherein the molar ratio of the crosslinking agent to the reducing sugar ranges from 1:5 to 1:10.

6. The fiber-containing composite of claim 1, wherein the crosslinking agent comprises 4,5-dihydroxyimidazolidin-2-one.

7. The fiber-containing composite of claim 1, wherein the binder composition further comprises a catalyst to catalyze a crosslinking reaction between the reducing sugar and the crosslinking agent.

8. The fiber-containing composite of claim 7, wherein the catalyst is chosen from a Lewis acid, a protic acid and a latent acid.

9. The fiber-containing composite of claim 8, wherein the Lewis acid is chosen from aluminum sulfate, ferric sulfate, aluminum chloride, ferric chloride, aluminum phosphate, and ferric phosphate.

10. The fiber-containing composite of claim 8, wherein the protic acid is chosen from sulfuric acid, phosphoric acid, hydrochloric acid, nitric acid, toluene sulfonic acid, methane sulfonic acid, and a carboxylic acid.

11. The fiber-containing composite of claim 8, wherein the latent acid is chosen from ammonium sulfate, ammonium hydrogen sulfate, monoammonium phosphate, diammonium phosphate, ammonium chloride, and ammonium nitrate.

12. The fiber-containing composite of claim 7, wherein the catalyst is an organo-metallic salt chosen from an organo-titanate salt, an organo-zirconate salt, and organo-tin salt, and an organo-aluminum salt.

13. The fiber-containing composite of claim 1, wherein the binder composition further comprises one or more non-reducing carbohydrates chosen from starch, modified starch, cellulose, modified cellulose, and dextrins.

14. The fiber-containing composite of claim 1, wherein the fiber-containing composite comprises a fiberglass building insulation.

15. The fiber-containing composite of claim 1, wherein the binder composition further comprises one or more additional compounds chosen from polymerization catalysts, adhesion promoters, flame retardants, organic fillers, inorganic fillers, waxes, colorants, and release agents.

16. A fiber-containing composite comprising:
   woven or non-woven fibers; and
   a cured binder formed from a binder composition comprising:
   reducing sugar; and
   a crosslinking agent comprising:

wherein $R_1$ and $R_2$ are independently —H, —OH, or —NH$_2$, wherein the cured binder includes crosslinked polymers formed by direct reaction of the crosslinking agent with the reducing sugar, and the cured binder substantially lacks crosslinked polymers formed by the reaction of free glyoxal with the reducing sugar; and wherein a molar ratio of the crosslinking agent to the reducing sugar ranges from 1:2 to 1:50.

17. A fiber-containing composite comprising:
woven or non-woven fibers; and
a cured binder formed from a binder composition comprising:
reducing sugar; and
a crosslinking agent comprising:

wherein $R_1$ and $R_2$ are independently —H, —OH, —NH$_2$, an alkyl group, an aromatic group, an alcohol group, an aldehyde group, a ketone group, a carboxylic acid group, or an alkoxy group, wherein the cured binder includes crosslinked polymers formed by direct reaction of the crosslinking agent with the reducing sugar, and the cured binder substantially lacks crosslinked polymers formed by the reaction of free glyoxal with the reducing sugar; and wherein a molar ratio of the crosslinking agent to the reducing sugar ranges from 1:4 to 1:5.

* * * * *